June 1, 1926.

C. W. SPICER

UNIVERSAL JOINT

Filed April 13, 1925

1,587,046

CLARENCE WINFRED SPICER.
INVENTOR

BY
ATTORNEY

Patented June 1, 1926.

1,587,046

UNITED STATES PATENT OFFICE.

CLARENCE WINFRED SPICER, OF PLAINFIELD, NEW JERSEY, ASSIGNOR TO SPICER MANUFACTURING CORPORATION, A CORPORATION OF VIRGINIA.

UNIVERSAL JOINT.

Application filed April 13, 1925. Serial No. 22,657.

My invention relates to universal joints and more particularly to that type of joint that is so designed and constructed that it will be unnecessary to lubricate it, and has for its object to produce a joint provided with "oilless" bearings and to provide a means that will prevent heat and centrifugal force from breaking up the bearing and otherwise disintegrate the bushings.

It is well known to those skilled in the art that bushings have been made of special composition or alloy impregnated with oil. In some instances as much as twenty-five percent or more in weight of the bushing is oil. These bushings if subjected to excessive pressures will loose the oil, and if subjected to heat the oil will come out on the surface of the bushing and be thrown off if subjected to centrifugal force. I have discovered that these "oilless" bushings have properties of reconstruction in that the composition will absorb the oil that comes to the surface if it does not get away, and one of the objects of this invention is to provide a bushing so constructed that it may be used in a universal joint that will conserve the bushing by retaining the oil.

The foregoing and other features of my invention will now be described in connection with the accompanying drawing forming part of this specification in which I have represented my universal joint in its preferred form after which I shall point out more particularly in the claims those features which I believe to be new and of my own invention.

Figure 1:
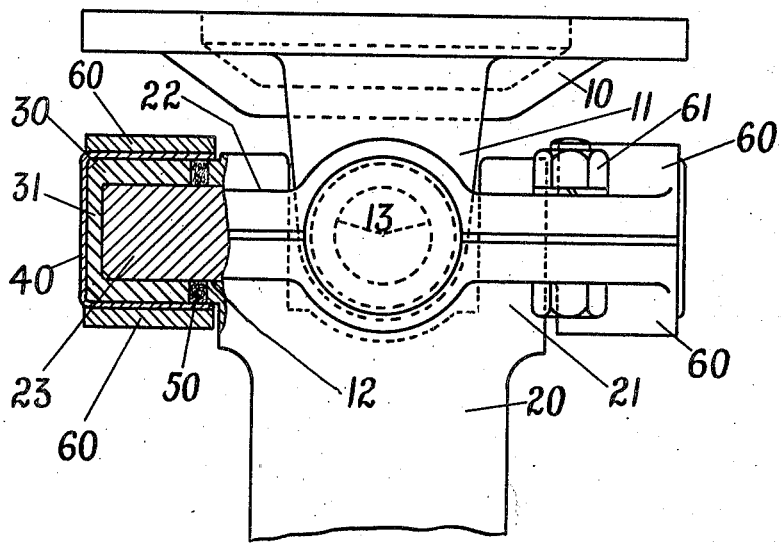
Figure 1 is a longitudinal view in part section showing my universal joint.

In the carrying out of my invention I provide two terminal coupling members which may be connected to any driving and driven members and are provided with journal pins mounted in a connecting member at right angles to each other providing universal movement. In the construction shown in the drawings, 10 is a flange yoke, provided with lugs 11 having holes 12 adapted to receive the journal pin 13 which serve as trunnions for the universal joint. As the opposing terminal member I have shown a forked member 20 provided with lugs 21 adapted to receive and hold a journal pin 23.

Figure 3:
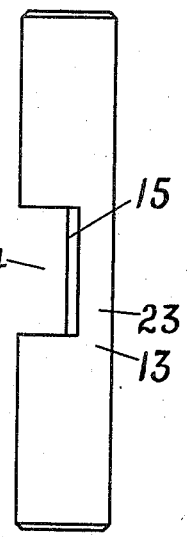
Figure 3 is a detail of the journal pin employed.
Figure 2:
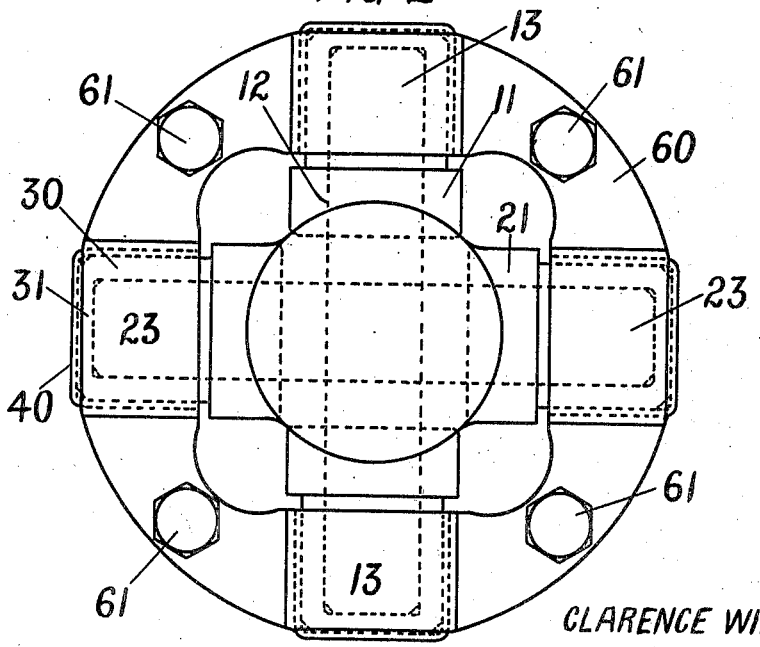
Figure 2 is a view at right angles to that shown in Figure 1.

It will be observed by referring to Figure 3 that these pins 13 and 23 are the same, each being cut away in the center as at 14 to provide clearance when assembled. These pins are solid and are not provided with any means for lubricating. As this form of cross pin construction is old, it should require no further description.

Adapted to fit on each end of these journal pins I provide a cup shape bushing 30 closed on the outer end 31 and entirely surrounding the end of the journal pin. This bushing is made of a composition impregnated with oil. Completely surrounding this bushing I provide a housing or shroud 40. The cylindrical portion of the shroud 40 is longer than the cylindrical portion of the bushing 30 to provide a place for a dust washer 50 should one be required.

These four bearings thus described in detail are held at ninety degrees from each other by two circular clamping plates 60 designed to tightly clamp the housing member or shroud 40.

In the assembly of this joint the journal pin 13 is pressed in the lugs 11 of the flange yoke 10 with the cut away portion 14 facing outwardly and bushings 30 and housing 40 inserted on each end of the journal pin, another journal pin 23 is pressed into the lugs 21 of the forked member 20 in the same manner and bushings 30 and housing 40 are placed on each end of the journal pin 23. Two circular clamping plates 60 are then bolted together by bolts 61 holding the parts assembled for universal movement as will be readily understood.

I wish it distinctly understood that my universal joint herein described and illustrated is in the form in which I desire to construct it but that changes or variations may be made as may be convenient or desirable without departing from the salient features of my invention and I therefore intend the following claims to cover such modifications as naturally fall within the lines of invention.

I claim:—

1. In a trunnion type universal joint a bearing comprising a cup like bushing of an alloy impregnated with oil and entirely surrounding the end of the trunnion, a cup like member of metal entirely surrounding the bushing, and in close contact therewith.

2. In a trunnion type universal joint a bearing comprising a bushing made of an alloy impregnated with oil surrounded by a housing of sheet metal, in close contact therewith, said housing completely covering the end.

3. A universal joint comprising trunnion type coupling members, a housing formed of two annular sections shaped to provide supporting means for trunnion bearings, trunnion bearings closed on the outer end, a member interposed between the housing and the bearings said member being completely filled by the bearing.

In testimony whereof I affix my signature.

CLARENCE WINFRED SPICER.